March 22, 1932.     A. O. JAEGER     1,850,797
CATALYTIC PROCESS AND APPARATUS
Filed April 29, 1930     2 Sheets-Sheet 1
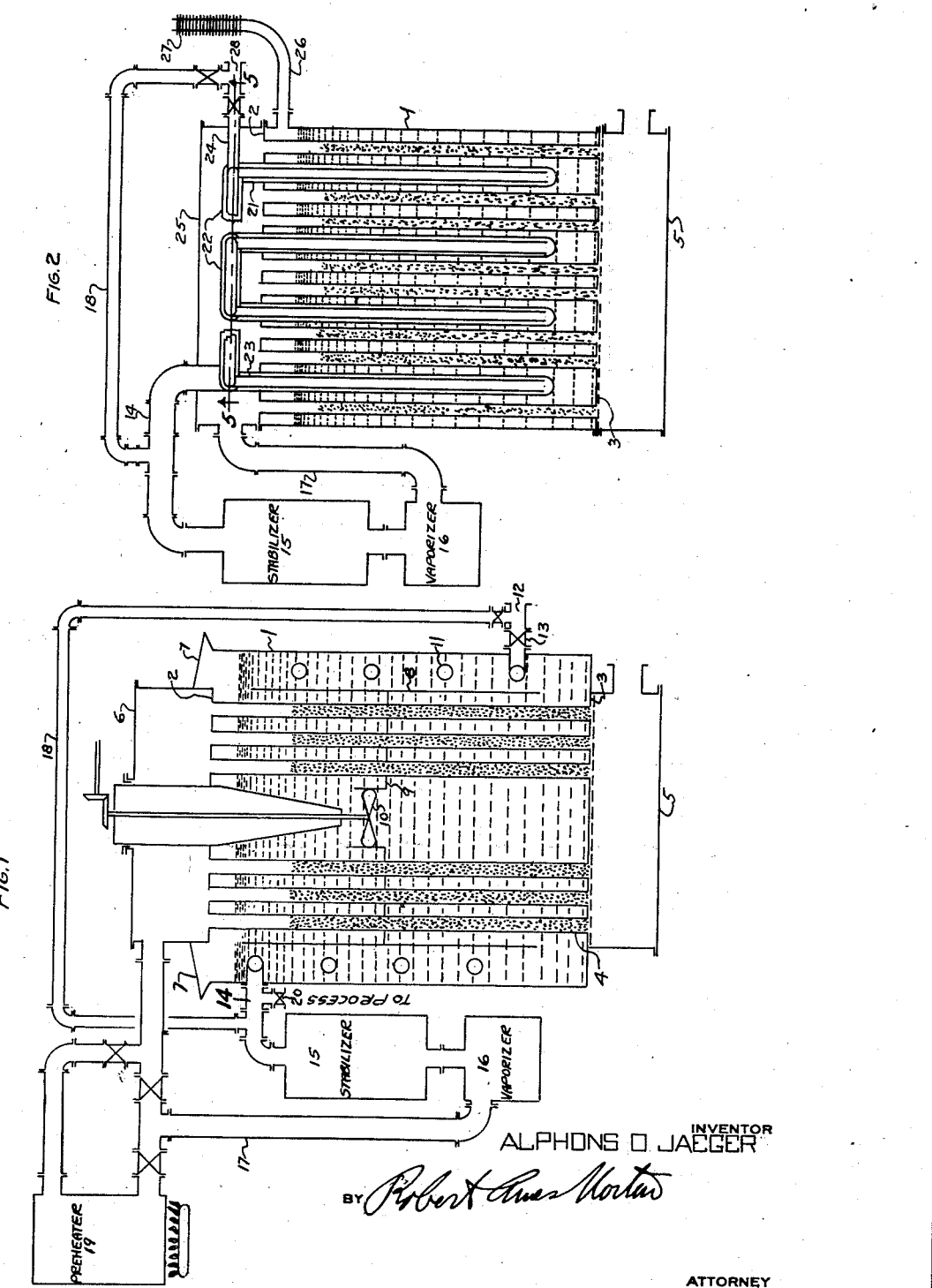

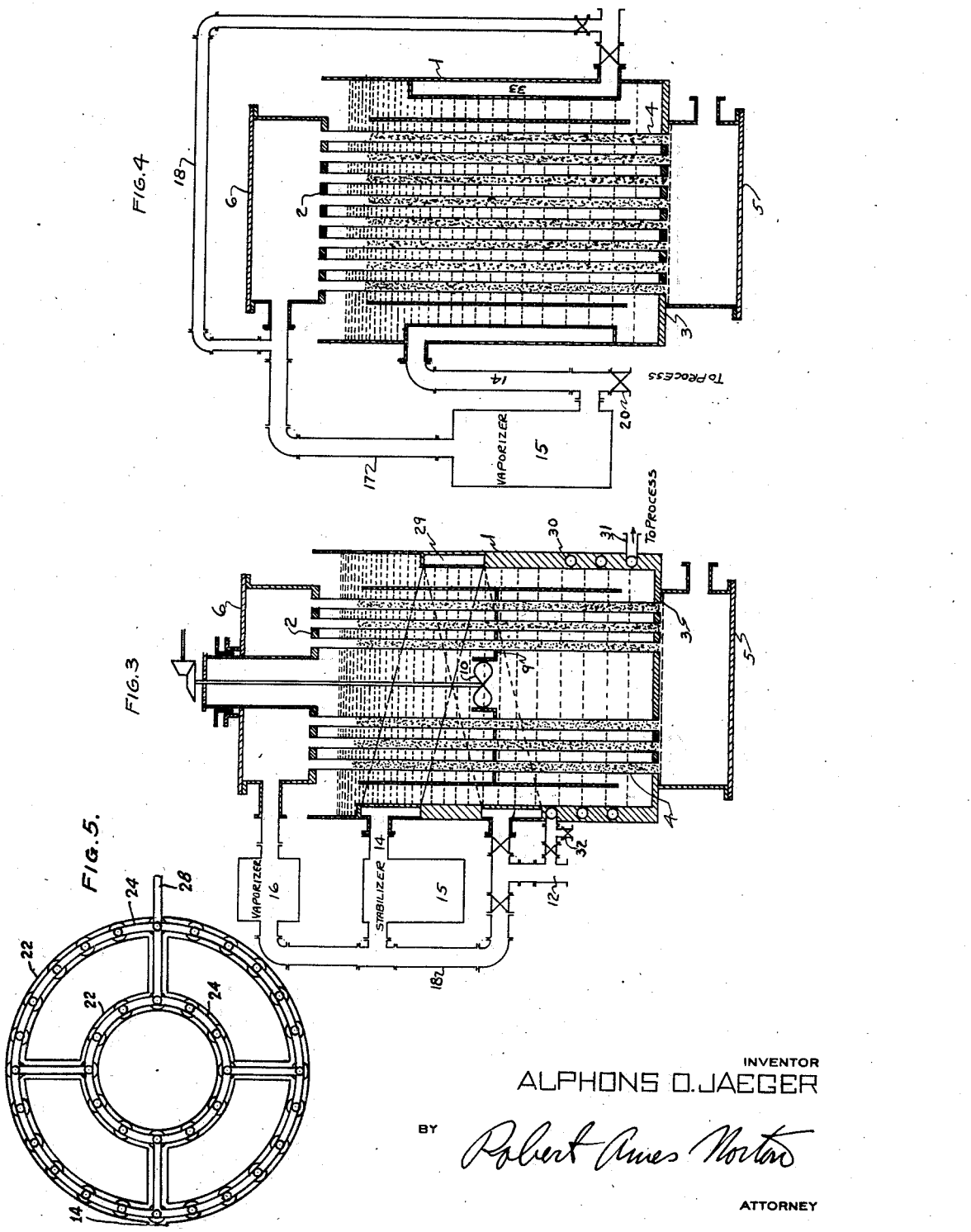

Patented Mar. 22, 1932

1,850,797

UNITED STATES PATENT OFFICE

ALPHONS O. JAEGER, OF MOUNT LEBANON, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

CATALYTIC PROCESS AND APPARATUS

Application filed April 29, 1930. Serial No. 448,410.

This invention relates to catalytic processes and apparatus for carrying them out, and more particularly to processes and apparatus for carrying out exothermic catalytic vapor phase reactions.

In the past exothermic catalytic vapor phase reactions have been carried out in converters cooled by means of various baths, boiling or non-boiling, particularly oxidations of organic compounds, which were usually carried out in tubular converters using a bath as a cooling medium. Bath cooled converters are satisfactory for many oxidations of organic compounds and other highly exothermic catalytic reactions, but where any of the raw material requires vaporization difficulties have been encountered in supplying the necessary heat to vaporize the constituents. This is a particularly serious matter in the catalytic oxidation of anthracene as the latter requires a temperature for vaporization well in excess of 200° C. and normally about 300° C. To obtain such a temperature involves costly apparatus, and the fuel cost is comparatively high since the gaseous components must also be heated up and preheating of gases is notoriously inefficient at high temperatures.

Boiling bath converters have been designed in which the vapors of the boiling bath are used to generate steam which is then used in vaporizing the raw materials entering into the catalytic reaction. This involves all the complications of a boiling bath and extra apparatus and particularly the enormous cost of mercury or mercury alloys which are ordinarily the only substances useful in boiling bath converters for high temperature catalytic reactions, and it is difficult or impossible to obtain steam at a sufficiently high temperature for vaporization of the material in many catalytic reactions, notably the catalytic oxidation of anthracene to anthraquinone.

The present invention solves all of the difficulties in the prior methods and constructions and at the same time retains their advantages. According to the present invention exothermic catalytic reactions are carried out in a bath cooled converter, preferably, although not necessarily, using a cheap non-boiling bath such as lead, other low melting metals or metal alloys, fused salts as, for example, a eutectic mixture of sodium nitrate and sodium nitrite, etc. The heat imparted to the bath by the reaction is removed by circulating air or other gas which is to form a component of the reaction mixture through heat exchange elements in heat exchanging relation with the bath. The highly heated gas or a portion of it, if necessary after suitable temperature regulation where its temperature is too high for satisfactory vaporization, is passed through a vaporizer in which the vaporizable component of the reaction mixture is vaporized. Where the reaction generates an amount of heat greatly in excess of that required for vaporizing the reaction component in question, part of the cooling gas may be used for vaporizing and part as a straight cooling agent. In the case of air or other cheap gases the cooling gas may be exhausted to the atmosphere, or it may be circulated through suitable coolers and returned, or it may be used as a source of heat for some other process to be carried on in proximity to the catalytic converter.

The gases used in removing heat from the bath may be a single gas or mixture or a plurality of different gases or mixtures. Thus, for instance, where the gas which is to form a portion of the reaction mixture is relatively expensive it may be circulated through a separate series of heat exchange elements in heat exchanging relation with the bath in quantities sufficient to supply the requisite amounts of reaction mixture to the reaction, and air or other cheap gas may be used in another set of cooling elements and may either be exhausted or recirculated or utilized in any other desired manner.

All of the heat of vaporization may be supplied by the hot gas which, of course, will then enter the vaporizer at a temperature considerably above that desired for the vaporized mixture, or a portion of the heat of vaporization may be imparted to the vaporizable material by suitable heating elements which may be supplied with heating medium of any kind and may, if desired, be also supplied with hot gas from the same or different set of cooling elements in contact with the bath. The particular arrangement of vaporizer heating will depend upon the amount of heat required, the relative sensitiveness of the vaporizable material to high temperatures and to time of contact and the like. Thus, in the case of very sensitive material it may be sprayed into the hot gas in a relatively cool state and be subjected to the high temperature only for a short period of time required for vaporization and passage to the converter. In other cases where the substance is comparatively resistant to moderate temperatures, even for a considerable period of time, but is much affected even by short periods of unusually high temperature, it is desirable to supply a good portion of the heat of vaporization by heating the vaporizable substance itself, the hot gases introduced into the vaporizer being then maintained at a lower temperature, below the point at which damage to the material results. In other cases, where the material is resistant both to long continued heating and to high temperatures, the choice of vaporizer arrangement may be dictated purely by convenience and cheapness of installation. It is an advantage of the present invention that it is extremely flexible and a vaporizing system may be used which is best fitted for the particular material to be vaporized. The invention is, therefore, not limited in its broader aspects to any particular combination of vaporizer, the general arrangements described above being merely mentioned as a few types. The best form of vaporizer will, of course, be chosen in connection with each particular catalytic reaction by the skilled chemist, taking into consideration the physical and chemical characteristics of the substance to be vaporized, and it is an advantage of the present invention that the chemist and engineer is given a very wide latitude in arrangement of vaporizer due to the inherent flexibility of the present system.

The arrangement of the gas heat exchange elements in the bath can be of any suitable type; thus, embedded elements may be used such as coils immersed in the bath, tubes extending therethrough, etc. or the walls of the converter may be provided with suitable channels (similar to the so-called Frederking system in which thick walls of apparatus are provided with embedded tubes) or suitable gas jackets may be attached to the walls of the converter.

In the drawings converter systems are shown diagrammatically as the particular mechanical construction forms no part of the present invention and any suitable structure may be used. Likewise, where a plurality of sets of heat exchange elements are used, as when the same or different cooling gases are to be used for two different purposes, the elements may be of the same type or different types, the choice depending, of course, on the particular conditions of the reaction and apparatus structure.

It is an advantage of the present invention that the heat is removed from the bath positively by media which may be sub-divided and, therefore, different cooling effects may be imparted to different portions of the bath to produce the best results, and, similarly, different types of mechanical heat exchange element construction and placement may be used in different portions of the converter to give the most satisfactory construction. This flexibility permits very satisfactory combinations in which the cooling effect of the present invention may be used to enhance bath circulation where a circulating bath is used and makes a close approach to ideal conditions possible in different converter installations, whereas in the past in many cases an only partially satisfactory compromise design has been necessary.

While the present invention is applicable to all exothermic catalytic vapor phase reactions it is particularly suitable for the catalytic oxidation of organic compounds or for the purification of organic compounds by catalytic combustion of impurities. A few typical examples are as follows:

1. Reactions in which an intermediate oxidation product is produced. The oxidation of benzol, toluol, phenol, tar phenols or furfural and other compounds containing the group

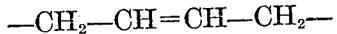

to maleic acid and fumaric acid or mesotartaric acid; cresol to salicylaldehyde and salicylic acid; toluol and the various halogen and nitro substituted toluols to the corresponding aldehydes and acids; xylenes, pseudocumene, mesitylene, paracymene and other derivatives to the corresponding aldehydes and acids; naphthalene to naphthaquinone, phthalic anhydride and maleic acid phthalic anhydride to maleic acid and fumaric acid; anthracene to anthraquinone; phenanthrene to phenanthraquinone, diphenic acid, phthalic anhydride and maleic acid; acenaphthene to acenaphthylene, acenaphthaquinone, bisacenaphthyl-idenedione, naphthaldehydic acid, naphthalic anhydride and hemimellitic acid; fluorene to fluorenone; eugenol and isoeugenol to vanillin and vanillic acid; methyl alcohol and methane to formaldehyde; ethyl alcohol to acetic acid; ethylene chlorhydrine to chloracetic acid and the like.

2. Reactions in which an undesired impuritiy is burned out, such as the purification of crude anthracenes of various degrees of impurity with total combustion of carbazole, dead oils and in some cases phenanthrene; purification of crude naphthalenes and crude mononuclear hydrocarbons, such as benzols and the like; purification of ammonia from coal tar with the burning out of the organic impurities such as phenolic bodies present, etc.

3. Oxidation of mixtures of organic compounds to desired intermediate products with removal of impurities such as the oxidation of crude anthracenes, phenanthrenes, and the like to intermediate products such as anthraquinone, phenanthraquinone, diphenic acid, phthalic anhydride, and the like with con-concomitant removal of carbazole and dead oils by total combustion; the oxidation of crude tar acids to maleic and fumaric acids with the combustion of certain impurities, etc.

Certain reductions such as the reduction of nitro compounds to amines or hydrogenated amines as, for example, the catalytic reduction of nitrobenzene, dinitrobenzene, nitrophenol, nitronaphthalene, etc. can be carried out using the principles of the present invention. Of course in such cases hydrogen or the necessary hydrogen-containing mixtures will be used instead of air or oxygen-containing gases which are employed in the organic oxidations. The reduction of oxides of carbon to methanol, methane, higher alcohols and ketones or petroleum-like products; the hydrogenation of aromatic compounds to alicyclic compounds such as, for example, benzene to cyclohexane, naphthalene to tetraline or decaline, anthracene to hydrogenated anthracenes, phenol to cylohexanol form another class. The reduction of unsaturated aliphatic hydrocarbons such as acetylene to ethylene or ethane and the like are also of importance and require a very careful temperature control. It should be noted that in the case of reactions, such as the reduction of oxides of carbon or acetylene, vaporization of the components is not necessary and the heated gases serve, therefore, to preheat the mixture to the desired temperature. While these reactions utilize the heat of the bath effectively they do not utilize it both for preheating and for supplying the latent heat of vaporization as in the case of materials which have to be vaporized.

A number of complex reactions such as combined reduction and splitting as, for example, the transformation of pyridine to amyl amine come within the purview of the present invention, as do complex reductions. Thus for example, oxides of carbon may be reduced in the presence of the vapors of many organic compounds. For example, they may be reduced in the presence of aliphatic hydrocarbons, such as paraffins, olefines, acetylenes, hydrocarbons having the formula

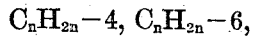
$C_nH_{2n}-4$, $C_nH_{2n}-6$, etc. Hydrogen may be present or absent, and the class of products obtained, such as mixtures of oxygenated compounds, or in many cases oils which are predominately hydrocarbon in their nature, will vary with the amount of the reacting ingredients and with the contact masses and reaction conditions used, and it is an advantage of the present invention that these novel combined reductions can be carried out in the desired direction with great effectiveness by the incorporation of suitable stabilizer promoters or stabilizers in the contact masses.

Another class of combined reaction consists in the reduction of oxides of carbon with or without hydrogen in the presence of vapors of aliphatic alcohols, such as paraffin alcohols having the formula $C_nH_{2n+1}OH$, or unsaturated alcohols having the formula $C_nH_{2n-1}OH$, or $C_nH_{2n-3}OH$, etc. Polyvalent alcohols such as glycol, glycerol and the like, may be reduced in combination with oxides of carbon with or without hydrogen. Oxidation products of alcohols, such as for example, saturated or unsaturated aldehydes and ketones, or oxidation products of polyvalent alcohols, such as glycolaldehydes, glyoxcal, glyoxcylic acid, oxalic acid, and the like, may be used for vapor phase reductions in the presence of oxides of carbon and hydrogen. Oxidation products of trivalent alcohols and divalent isomeric alcohols may also be used, of course only where it is possible to obtain the vapors of the compounds without undesired decomposition.

Aliphatic acids form another important class of compounds which can be reduced in combination with oxides of carbon. The acids include fatty acids, oxyacids, lactones, polybasic acids, ketone acids, and the like. Other miscellaneous aliphatic carbonyl compounds such as aldehyde alcohols, diketones, triketones, oxymethylene ketones, ketone aldehydes, ketone alcohols and the like, may also be combined with oxides of carbon and reduced in the presence of the contact mass described above to form many valuable products.

In addition to compounds of the aliphatic series which may be reduced together with oxides of carbon, various compounds of the alicyclic series, such as for example, alicyclic compounds, for instance, cycloparaffins, cycloolefines, cyclodiofines may be combined with oxides of carbon and reduced. Examples of specific members of this class are cyclohexane, cyclopentadiene, dicyclopentadiene, and the like. Of course alicyclic carbonyl compounds, such as cyclohexanol, cyclohexanone, etc., may be used, it being understood in this connection and throughout the specification that any compound containing the CO group, irrespective of whether the oxygen is united to carbon with a single, or a double bond, are included under the term carbonyl compounds.

Aromatic compounds, such as benzene hydrocarbons, naphthalenes, anthracenes, phenanthrenes, phenols, aromatic alcohols, aldehydes, ketones and acids may be reduced in the presence of oxides of carbon and hydrogen, of course only insofar as the products are capable of volatilization without undesired decomposition.

Heterocyclic compounds, such as products containing the furane nucleus, pyrrole bodies, pyrrolidines and the like, may be reduced together with oxides of carbon.

In the inorganic field the synthesis of ammonia can be effectively carried out, all of the heat being conserved in a very efficient manner by passing the nitrogen-hydrogen mixture or part of it as the cooling agent for the bath.

The present invention renders the expense of a boiling bath unnecessary although it can be used with a bath which boils, preferably one which boils at a temperature somewhat above that at which the reaction is to take place, so that if undue amounts of heat are evolved the bath can boil in an emergency and thereby increase the cooling so as to take care of the additional heat evolved. Such normally non-boiling baths, but which will boil in an emergency, are well suited for use in the present invention where the reaction warrants the extra cost of the bath.

The invention will be described in greater detail in connection with the drawings in which Fig. 1 is a vertical section through a simple type of circulating type converter using the principles of the present invention;

Fig. 2 is a vertical section through a converter with heat exchange elements distributed among the tubes;

Fig. 3 is a vertical section through a converter showing a combination of two cooling media;

Fig. 4 is a vertical section through a converter showing a modified heat exchange element construction; and Fig. 5 is a cross-section through Fig. 2 along the line 5—5.

The converter shown in Fig. 1 consists of a converter shell 1, a bottom tubesheet 3 rigidly fastened to the converter shell, tubes 4 extending upwardly from the bottom tubesheet and supporting an upper tubesheet 2 capable of vertical motion with respect to the shell but connected thereto by a flexible gas-tight connection 7. The bottom piece 5 serves as an exhaust gas collector and a top piece 6 serves as a reaction gas inlet, the reaction gases passing downwardly through the tubes 4 which may be completely or partly filled with catalyst. A cylindrical vertical baffle 8 is provided surrounding the bundle of tubes and defining with the converter shell a cooling chamber external to the catalyst tube zone.

The converter is filled with a non-boiling bath to a point above the top of the vertical baffle 8 as indicated on the drawings, and a horizontal baffle 9 and impeller 10 are provided to bring about a positive circulation of the bath liquid upwardly from the tubes and then down between the vertical baffle 8 and the converter shell 1. In this cooling chamber is placed a coil 11 through which the cooling gas circulates from the intake pipe 12 controlled by a suitable valve 13 and passes through the exit pipe 14 and a temperature stabilizer 15 into a vaporizer 16. Thence, the reaction mixture passes through pipe 17 into the top piece 6. A valved by-pass 18 is provided so that cold intake gas may be introduced into the exit pipe 14 before passing through the stabilizer.

For convenience, the operation of the converter will be described in connection with the oxidation of anthracene to anthraquinone, it being understood of course that it is generally suitable for other exothermic reactions described above. In operation, therefore, the converter is filled with suitable bath, for example molten lead, an inert atmosphere such as carbon dioxide or preferably nitrogen being maintained over the bath surface and protected from leakages from the atmosphere by gas-tight, flexible connection 7. In general the inert atmosphere may be maintained at a pressure just above the atmosphere so that any leaks which might possibly take place would be into the atmosphere, the purpose being to prevent oxidation of the lead bath. The lead bath is heated up to about 400° C. by any suitable means, for example passing hot gases through the catalyst tubes from a gas preheater shown diagrammatically at 19 in shunt with pipe 17. As soon as the bath is at the desired temperature air is passed through the coil 11 and the hot air after passing through the stabilizer 15 where it is cooled to a steady temperature of about 300° C. passes through the vaporizer 16 and the vaporized anthracene-air mixture, for example in the ratio of one gram of anthracene to 20–30 liters of air, passes through the catalyst tubes 4, being oxidized to anthraquinone and generating heat, which is absorbed by the lead bath and as the latter circulates down over the coil 11 the heat is removed by the air passing therethrough.

As the oxidation of anthracene generates about sufficient heat to take care of the vaporizing it is ordinarily not necessary to provide for additional cooling of the bath but with more powerfully exothermic reactions this may be effected by utilizing the valved vent pipe 20, part of the heated air leaving the coil 11 being permitted to pass into the atmosphere or to another process where its heat may be utilized. If the temperature drops too low the preheater 19 may be cut in to bring the temperature up to the desired point. Where a very high highly exothermic reaction is carried out, for example the catalytic oxidation of naphthalene to phthalic anhydride, there is a large excess of heat and the preheater 19 need only be used to start up the converter but for reactions such as the catalytic oxidation of anthracene where the heat evolved is little, if any, in excess of the heat required for vaporization, the preheater must be continuously available in order to take care of any heat deficiency which may occur with fluctuations in the vaporizer feed. The vaporizer, stabilizer and preheater are shown purely diagrammatically as their exact construction forms no part of the present invention.

Figs. 2 and 5 show somewhat different arrangement of heat exchange elements. Similar portions of the apparatus bear similar reference numerals.

Instead of providing a mechanical circulation of the bath and locating the heat exchange elements in a portion separated from the catalyst tubes, telescoping heat exchange tubes are interspersed among the catalyst tubes themselves. These heat exchange tubes consist of closed-end tubes 21 fastened into large circular manifolds 22 and open-end tubes 23 fastened into small manifolds 24 which are inside and concentric with the large manifolds 22. The top piece 25 defines with the tubesheet 2 a vapor inlet space. The upper catalyst tubesheet 2 is shown rigidly attached to the shell 1 instead of through a flexible connection as in Fig. 1 and the vapor tube 26 and reflux condenser 27 are shown communicating with the vapor space above the bath level in the shell 1.

This type of converter is suitable for very sensitive reactions which easily tend to get out of control. Such reactions, for example, as the catalytic oxidation of side chain aromatic compounds to aldehydes and acids or the reduction of acetylene to ethylene can be effectively carried out in this type of converter.

In operation a bath is used which boils a few degrees above the temperature at which it is desired to maintain the reaction. This, in the case of the catalytic oxidation of side chain aromatic compounds, may be mercury or an alloy of mercury such as a mercury-lead alloy, or in the case of the hydrogenation of acetylene it may be water, a water solution of a suitable salt or mineral oil. The boiling point of the bath is adjusted from 10 to 40° above that at which the bath is intended to be maintained during normal reaction, the difference depending on the sensitiveness of the particular reaction. The gaseous component such as, for example, an oxygen-containing gas in the case of catalytic oxidation of aromatic side chain compounds, enters the small manifold 24 through the valved inlet pipe 28, passes down through the open-end tubes 23, reverses its direction and passes up through the annuli defined between the open-end tubes 23 and the closed-end tubes 21 where it is in highly efficient heat exchange relation with the bath, and after leaving the closed-end tubes 21 it enters the large manifold 22 and passes through the outlet pipe 14 to the stabilizer 15, thence, into the vaporizer 16 where the vaporized mixture passes through the pipe 17 into the vapor inlet space between the tubesheet 2 and the top piece 25 and thence down through the catalyst tubes. A valved by-pass 18 is provided from the intake pipe 28 to the exit pipe 14 and operates in the same manner as the by-pass in Fig. 1.

In normal operation the bath is maintained at the desired temperature and the heat utilized to vaporize and preheat the incoming reaction gas mixture. Should, however, the reaction threaten to become uncontrollable, the temperature of the bath will rise rapidly and when it has passed its boiling point will begin to boil, which will prevent any further rise in temperature since the additional heat will be absorbed by the bath in the form of latent heat of vaporization. The vapors of the boiling bath pass out through the pipes 26 into the reflux condenser 27 which are diagrammatically shown as air-cooled. The single vertical section of Fig. 2 shows of course but one reflux, but naturally a sufficient number of refluxes are used to take care of the vapor evolution used in the case of emergency.

The converter shown in Figs. 2 and 5 illustrates the use of two concentric rings of double countercurrent heat exchange elements extending into the bath. It should be understood that a larger number of rings may be used in larger converters, the relative spacing of the rings depending on the intensity of the reaction and the degree of temperature uniformity desired in the bath. Of course instead of using concentric rings other forms of manifolding the distribution of the heat exchange tubes may be employed; thus, for example, concentric hexagons in circular or hexagonal converters and in square converters concentric squares or parallel rows may be used. In the latter case, of course, each row will have its own double manifold.

The converter shown in Figs. 2 and 5 may, of course, be used with a permanently non-boiling bath and its gas-tight construction easily permits maintaining a suitable inert atmosphere over the bath, which is desirable in the case of metal baths such as lead baths, but the rigid connection between the tubesheet 2 and the shell 1 involves the usual disadvantage of an ordinary boiling bath converter as a differential expansion of the shell 1 and tubesheet 2 will result in warping of the tubesheets with the corresponding maintenance difficulties due to leak formation and the necessity for an elaborate tube fastening in both tubesheets. Where, therefore, a non-boiling bath is to be used it is ordinarily preferable to utilize a flexible construction such as is shown in Fig. 1 and also below in Figs. 3 and 4 where the upper tubesheet floats on the tubes and differential expansion of shell and tubes sets up no stresses.

Fig. 3 illustrates a circulating bath cooled converter similar to Fig. 1, like parts bearing like reference numerals, but in this modification two series of cooling elements are shown, the relatively broad channel 29 for the air to pass through the stabilizer into the vaporizer and a coil 30 of small diameter pipe from which the heated air passes out through an exit pipe 31 and can either be vented or used for any other purpose. A single cold air inlet 12 is shown, but it should be understood that if desired different gases may be used in the different heat exchange elements.

This modification also shows the embedding of the heat exchange elements in the walls of the converter, the so-called Frederking system. The converter of the type shown in Fig. 3 may be used in highly exothermic reactions such as the catalytic oxidation of naphthalene to phthalic anhydride, of acenaphthene to naphthalic anhydride, or benzene to maleic acid. In these reactions the heat evolved is far in excess of that required to vaporize and the temperature may, therefore, be controlled by the amount of air passing through the coil 30 while keeping a constant flow through the rectangular coil 29 in order to assure a uniform flow of reaction mixture through the apparatus.

Where a reaction gas other than air is required it may be used in the coil 29 and in the coil 30. This, of course, necessitates using a separate air intake to coil 30 which is shown as the valved pipe 32. Of course, if desired the two coils may be of the same type and either or both of them may be immersed in the bath liquid as shown in Fig. 1.

In Fig. 3 the cooling coil 30 is shown below the preheating coil 29. In the case of highly exothermic reactions, such as the catalytic oxidation of naphthalene to phthalic anhydride, where the amount of heat removed by the coil 30 is far in excess of that removed by the coil 29, it is desirable to have the coil 30 below the coil 29 so that the lower portion of the bath is maintained at a lower temperature than the upper part in order to facilitate the circulation. Where, however, the reaction requires almost all of the exotherm for vaporizing and uses a second cooling coil only to take a small overflow, then the placement of coils should ordinarily be reversed so as to make for the most effective circulation of bath. However, sometimes in highly exothermic reactions it may be desirable to use a placement the reverse of Fig. 3 so that the highest heat head may be between the bath and the cooling coil 30 in order to assure the most rapid removal of heat.

In such cases it is also frequently desirable to have the coil 30 directly immersed in the bath. In fact the choice as to whether the coil is to be immersed in the bath liquid or partly or wholly embedded in the converter shell depends on the particular factor involved. A construction in which the coil is immersed in the bath is cheaper, gives a higher heat exchange efficiency but a breakage of the coil is very serious especially if the bath liquid tends to react with the gas used in the cooling coil. The present invention is not concerned with either particular arrangement, the choice being dictated by the conditions of a particular installation.

In the separate cooling coil 30 it is possible to use gaseous media which are not fixed gases and it is sometimes desirable to use vapors such as, for example, steam instead of a true gas. Steam has the advantage that it has a much higher heat capacity than air. It should be understood, of course, that when referring to a gaseous medium vapors as well as gases are included.

Fig. 3 is not only useful in highly exothermic catalytic oxidations of organic compounds to intermediate products such as those specifically referred to above but may also be used for the catalytic purification of anthracene in which carbazole and to some extent phenanthrene is burned out. This type of converter is particularly effective in such a reaction as the amount of cooling in the separate cooling coil 30 can be varied to take care of crude anthracene of various grades of purity. Of course the exotherm in the reaction will vary with the amount of impurity burned out and the flexibility of this type of converter makes it very useful for the purification of crude anthracenes of various degrees of purity. Of course the purification of anthracene raises the same problem of high temperature vaporization, as does the catalytic oxidation of anthracene to anthraquinone, and likewise constitutes a reaction which utilizes all of the features of the present invention very fully.

Fig. 4 shows a simplified converter similar to Fig. 1 (like parts bearing like numerals), but provides for thermosiphon circulation of the bath instead of mechanical circulation of the bath. Also, instead of immersing tubes in the bath an air jacket 33 is fastened on to the inside of the converter shell. This construction gives efficient heat exchange where the amount of heat to be removed is not too great and can be effectively utilized in reactions where the amount of heat evolved is not excessive. This modification also eliminates the stabilizer which is only necessary where the temperature of the gas coming from the heat exchange elements in the bath is higher than that desired for vaporization.

It will be noted that Figs. 3 and 4 show the bath as open to the atmosphere, but of course a flexible connection may be used as in Fig. 1 where the bath is of such a nature as to require the provision of an inert atmosphere.

A few typical embodiments of the invention have been shown with various features illustrated in each embodiment. It should be understood that the particular association of features in the different figures in no sense limits the invention to such an arrangement and the features shown in one figure may be used wherever suitable in any of the others. The drawings are purely diagrammatic and the usual accessories such as insulation, temperature measuring instruments, etc. will, of course, be provided by the skilled chemical engineer.

In Figs. 1, 3 and 4, where the circulating bath converter is shown, the bath is removed from the zone of the catalyst tubes before it is subjected to the cooling action of the heat exchange elements. In the claims the expression "out of heat exchange relation" is used to define this removal of the bath to a separate compartment. The expression should not be taken in a narrow sense as meaning the removal from actual contact with the walls of the catalyst tubes. Such a narrow construction would apply to the interspersed cooling tubes of Fig. 2 but it is intended to distinguish thereover and to define the type of converter illustrated in Figs. 1, 3 and 4.

What is claimed as new is:

1. A method of carrying out an exothermic catalytic vapor phase reaction in which at least one component of the reaction mixture is non-gaseous at ordinary temperatures and at least one component is a gas, which comprises passing the reaction gas mixture through catalyst zones, absorbing the heat generated therein by means of a bath in heat exchange relation with said catalyst zones, and removing at least a portion of the heat of said bath by passing at least a portion of a gaseous component of the reaction gas mixture in heat exchanging relation with the bath and utilizing at least a portion of the heat absorbed by said component of reaction gas mixture to effect vaporization of the normally non-gaseous component of the reaction.

2. A method according to claim 1, in which the reaction is the catalytic oxidation of an organic compound.

3. A method according to claim 1, in which the reaction is the catalytic oxidation of an aromatic compound.

4. A method according to claim 1, in which the bath is one which does not boil under normal reaction conditions.

5. A method of catalytically oxidizing anthracene-containing material, which comprises passing a mixture of vapors of the anthracene-containing material and an oxygen-containing gas through catalyst zones, absorbing the heat given off by the oxidation reaction by means of a bath in heat exchanging relation with the catalyst zones, removing at least a portion of the heat from said bath by passing an oxygen-containing gas in heat exchanging relation therewith, at least a part of said heated oxygen-containing gas being brought into contact with the anthracene-containing material to be vaporized and forming with the vapors thereof the said reaction mixture.

6. A method according to claim 5, in which the reaction is the catalytic oxidation of anthracene to anthraquinone.

7. A method according to claim 5, in which the reaction is the catalytic oxidation of anthracene and the oxygen-containing gas is air.

8. A method according to claim 5, in which the temperature of the oxygen-containing gas is adjusted before contacting with the anthracene containing material to be vaporized.

9. A method according to claim 5, in which the bath is caused to circulate around from heat exchanging relation with the catalyst zones to an external cooling zone and the oxygen-containing gas is caused to pass in heat exchanging relation with the bath in said external zone.

10. An apparatus for carrying out exothermic catalytic vapor phase reactions comprising in combination a tubular converter and bath therein surrounding the catalyst tubes, a vaporizer operatively connected to said converter by a reaction gas intake, at least one system of heat exchange elements in heat exchanging relation with at least a portion of said bath, means permitting introduction of a gaseous medium into said heat exchange element system and connections between the exit, the said heat exchange element system, and the vaporizer.

11. A catalytic apparatus according to claim 10, in which a plurality of heat exchange element systems are used, at least one of which has no connection to the vaporizer.

12. A catalytic apparatus according to claim 10, in which a plurality of heat exchange element systems are used, at least one of which has no connection to the vaporizer and separate means are provided permitting introduction of a gaseous medium into said heat exchange element system unconnected with the vaporizer.

13. An apparatus according to claim 10, in which baffling structure is provided forming with the converter shell at least one chamber remote from the catalyst tubes and defining a bath circuit from the catalyst tubes through said remote chamber and back to the catalyst tubes, at least part of the heat exchange element systems being in heat exchange relation with the bath in said remote chamber.

14. An apparatus according to claim 10, in which baffling structure is provided forming with the converter shell at least one chamber remote from the catalyst tubes and defining a bath circuit from the catalyst tubes through said remote chamber and back to the catalyst tubes, at least part of the heat exchange element systems being in heat exchange relation with the bath in said remote chamber, said converter being provided with means for positively circulating the bath liquid through said defined bath circuit.

Signed at Pittsburgh, Pennsylvania, this 23rd day of April, 1930.

ALPHONS O. JAEGER.